(12) United States Patent
Berman et al.

(10) Patent No.: US 12,211,340 B2
(45) Date of Patent: Jan. 28, 2025

(54) GAMING DEVICES USING SUBSYMBOL BONUS FEATURE

(71) Applicant: KING SHOW GAMES, INC., Minnetonka, MN (US)

(72) Inventors: Bradley Berman, Minnetonka, MN (US); Jacob Lamb, Maple Grove, MN (US); Anthony Rath, St. Louis Park, MN (US)

( * ) Notice: Subject to any disclaimer, the term of this patent is extended or adjusted under 35 U.S.C. 154(b) by 0 days.

(21) Appl. No.: 18/235,599

(22) Filed: Aug. 18, 2023

(65) Prior Publication Data

US 2023/0394908 A1 Dec. 7, 2023

Related U.S. Application Data

(63) Continuation of application No. 17/682,729, filed on Feb. 28, 2022, now Pat. No. 11,734,991, which is a continuation of application No. 16/989,323, filed on Aug. 10, 2020, now Pat. No. 11,263,861, which is a continuation of application No. 15/911,687, filed on Mar. 5, 2018, now Pat. No. 10,741,008.

(60) Provisional application No. 62/466,890, filed on Mar. 3, 2017.

(51) Int. Cl.
*G07F 17/32* (2006.01)
*G06F 3/04817* (2022.01)
*G06F 3/0354* (2013.01)

(52) U.S. Cl.
CPC ...... *G07F 17/3211* (2013.01); *G06F 3/04817* (2013.01); *G07F 17/3244* (2013.01); *G07F 17/3262* (2013.01); *G07F 17/3293* (2013.01); *G06F 3/03547* (2013.01); *G07F 17/3209* (2013.01)

(58) Field of Classification Search
CPC ............ G07F 17/3211; G07F 17/3244; G07F 17/3262; G07F 17/3293; G07F 17/3209; G06Q 3/04817; G06Q 3/03547
See application file for complete search history.

(56) References Cited

U.S. PATENT DOCUMENTS

| | | | |
|---|---|---|---|
| 5,688,174 A * | 11/1997 | Kennedy | G07F 17/32 463/47 |
| 5,788,573 A | 8/1998 | Baerlocher et al. | |
| 5,823,873 A | 10/1998 | Moody | |
| 5,967,893 A * | 10/1999 | Lawrence | G07F 17/3293 463/16 |
| 6,007,066 A | 12/1999 | Moody | |
| 6,098,985 A | 8/2000 | Moody | |

(Continued)

*Primary Examiner* — David L Lewis
*Assistant Examiner* — Matthew D Hoel

(57) ABSTRACT

Embodiments of the present invention set forth systems, apparatuses and methods for implementing bonus features using subsymbols during game play. Accordingly, a gaming device can be configured to randomly overlay or otherwise associate zero, one, or more subsymbols on game symbols used in a game of chance. When subsymbols appear on game symbols that are randomly determined to be part of the game outcome, a bonus feature is triggered that may be used to modify awards provided from the game outcome. The presence of the subsymbols themselves may act as a trigger for a secondary bonus feature or event, or the subsymbols themselves may show random indicia within the subsymbol that provides a bonus modifier or other award.

20 Claims, 17 Drawing Sheets

(56) References Cited

U.S. PATENT DOCUMENTS

| | | | |
|---|---|---|---|
| 6,159,095 A * | 12/2000 | Frohm | G07F 17/32 |
| | | | 463/19 |
| 6,190,255 B1 | 2/2001 | Thomas et al. | |
| 6,213,876 B1 | 4/2001 | Moore | |
| 6,224,483 B1 | 5/2001 | Mayeroff | |
| 6,334,814 B1 | 1/2002 | Adams | |
| 6,517,074 B1 | 2/2003 | Moody et al. | |
| 6,612,927 B1 * | 9/2003 | Slomiany | G07F 17/3267 |
| | | | 463/16 |
| 6,652,377 B1 | 11/2003 | Moody | |
| 6,926,607 B2 * | 8/2005 | Slomiany | G07F 17/3262 |
| | | | 463/16 |
| 7,247,092 B2 | 7/2007 | Jarvis et al. | |
| 7,267,611 B2 * | 9/2007 | Slomiany | G07F 17/32 |
| | | | 463/16 |
| 7,354,342 B2 | 4/2008 | Paulsen et al. | |
| 7,811,165 B2 * | 10/2010 | Slomiany | G07F 17/3267 |
| | | | 463/16 |
| 8,118,655 B1 * | 2/2012 | Maksymec | G07F 17/326 |
| | | | 463/13 |
| 8,147,310 B2 | 4/2012 | Jarvis et al. | |
| 8,419,518 B2 | 4/2013 | Jarvis et al. | |
| 8,439,737 B1 | 5/2013 | Moody | |
| 8,662,979 B2 * | 3/2014 | Suttle | G07F 17/3293 |
| | | | 463/13 |
| 8,668,573 B1 | 3/2014 | Mayeroff | |
| 9,472,064 B2 * | 10/2016 | Acres | G07F 17/34 |
| 9,569,934 B2 | 2/2017 | Berman | |
| 9,576,437 B2 | 2/2017 | Berman | |
| 9,633,522 B2 * | 4/2017 | Berman | G07F 17/3293 |
| 9,640,037 B2 * | 5/2017 | Berman | A63F 9/24 |
| 9,691,230 B2 * | 6/2017 | Jackson | G07F 17/3293 |
| 9,711,011 B2 * | 7/2017 | Berman | G07F 17/3244 |
| 9,858,767 B2 * | 1/2018 | Billings | G07F 17/3293 |
| 9,870,677 B1 * | 1/2018 | Nottke | G07F 17/3293 |
| 10,008,075 B2 | 6/2018 | Berman | |
| 10,074,241 B2 * | 9/2018 | Berman | G07F 17/3262 |
| 10,134,241 B2 * | 11/2018 | Berman | G07F 17/3251 |
| 10,169,959 B2 * | 1/2019 | Berman | G07F 17/3244 |
| 10,424,168 B1 * | 9/2019 | Nottke | G07F 17/3293 |
| 10,424,169 B2 * | 9/2019 | Arnone | G07F 17/326 |
| 10,467,859 B2 * | 11/2019 | Berman | G07F 17/3293 |
| 10,905,958 B2 * | 2/2021 | Imai | A63F 13/57 |
| 10,977,902 B1 * | 4/2021 | Nottke | G07F 17/3293 |
| 11,484,794 B2 * | 11/2022 | Imai | A63F 13/818 |
| 2002/0082074 A1 | 6/2002 | Bennett | |
| 2003/0064790 A1 | 4/2003 | Hughs-Baird et al. | |
| 2003/0071417 A1 | 4/2003 | Webb | |
| 2003/0122302 A1 * | 7/2003 | Boulton | G07F 17/32 |
| | | | 463/20 |
| 2004/0002376 A1 | 1/2004 | Swift et al. | |
| 2004/0152498 A1 | 8/2004 | Kaminkow et al. | |
| 2004/0229670 A1 | 11/2004 | Potter et al. | |
| 2005/0148383 A1 | 7/2005 | Mayeroff | |
| 2005/0173863 A1 | 8/2005 | Walker et al. | |
| 2006/0040723 A1 | 2/2006 | Baerlocher et al. | |
| 2006/0063584 A1 | 3/2006 | Brill et al. | |
| 2006/0160595 A1 | 7/2006 | Gerson et al. | |
| 2007/0026920 A1 * | 2/2007 | Flint | G07F 17/3267 |
| | | | 463/13 |
| 2007/0167208 A1 | 7/2007 | Acres | |
| 2008/0009344 A1 | 1/2008 | Graham et al. | |
| 2008/0113760 A1 | 5/2008 | Baerlocher | |
| 2008/0146305 A1 | 6/2008 | Moody | |
| 2009/0061975 A1 * | 3/2009 | Ditchev | G07F 17/3293 |
| | | | 463/13 |
| 2009/0111556 A1 | 4/2009 | Moody | |
| 2009/0117993 A1 | 5/2009 | Bigelow, Jr. et al. | |
| 2009/0258695 A1 | 10/2009 | Graham et al. | |
| 2009/0298568 A1 * | 12/2009 | Pacey | G07F 17/3293 |
| | | | 463/43 |
| 2011/0092261 A1 * | 4/2011 | Naicker | G07F 17/3293 |
| | | | 463/11 |
| 2011/0092262 A1 * | 4/2011 | Naicker | G07F 17/32 |
| | | | 463/13 |
| 2011/0312409 A1 | 12/2011 | Vancura | |
| 2012/0077559 A1 * | 3/2012 | Sestak | G07F 17/3293 |
| | | | 463/13 |
| 2012/0094731 A1 * | 4/2012 | Berman | G07F 17/3293 |
| | | | 463/13 |
| 2012/0214566 A1 * | 8/2012 | Suttle | G07F 17/3258 |
| | | | 463/13 |
| 2012/0295692 A1 * | 11/2012 | Payne | G07F 17/3293 |
| | | | 463/22 |
| 2012/0315970 A1 * | 12/2012 | Stjarnlov | G07F 17/3262 |
| | | | 463/13 |
| 2013/0029750 A1 | 1/2013 | Moody | |
| 2013/0217457 A1 | 8/2013 | Jarvis et al. | |
| 2013/0260853 A1 * | 10/2013 | Sparago | G07F 17/3293 |
| | | | 463/12 |
| 2013/0296010 A1 * | 11/2013 | Berman | G07F 17/3293 |
| | | | 463/13 |
| 2013/0310127 A1 * | 11/2013 | Berman | G07F 17/3267 |
| | | | 463/13 |
| 2014/0066156 A1 * | 3/2014 | Squitieri | G07F 17/3293 |
| | | | 463/12 |
| 2014/0221067 A1 * | 8/2014 | Hodgson | G07F 17/3293 |
| | | | 463/11 |
| 2015/0024825 A1 * | 1/2015 | Macdonald | G07F 17/326 |
| | | | 463/17 |
| 2015/0031432 A1 * | 1/2015 | Morrash | G07F 17/3293 |
| | | | 463/13 |
| 2015/0057064 A1 * | 2/2015 | Lee | G07F 17/3237 |
| | | | 463/13 |
| 2015/0072747 A1 * | 3/2015 | Burnside | G07F 17/3276 |
| | | | 463/13 |
| 2015/0087370 A1 * | 3/2015 | Hematji Rajput | G07F 17/3293 |
| | | | 463/11 |
| 2015/0119123 A1 * | 4/2015 | Alexander | G07F 17/3283 |
| | | | 463/13 |
| 2015/0221179 A1 * | 8/2015 | Moore | G07F 17/3293 |
| | | | 463/13 |
| 2016/0078728 A1 * | 3/2016 | Berman | G07F 17/3262 |
| | | | 463/13 |
| 2016/0140809 A1 * | 5/2016 | Berman | G07F 17/3244 |
| | | | 463/20 |
| 2016/0328925 A1 * | 11/2016 | Cheng | G07F 17/3225 |
| 2017/0087443 A1 * | 3/2017 | Milosevich | A63F 3/00157 |
| 2018/0253932 A1 * | 9/2018 | Berman | G07F 17/3293 |
| 2019/0099661 A1 * | 4/2019 | LaDuca | G07F 17/3267 |
| 2019/0139364 A1 * | 5/2019 | Lamb | G07F 17/3244 |
| 2019/0321728 A1 * | 10/2019 | Imai | A63F 13/525 |
| 2020/0155937 A1 * | 5/2020 | Imai | A63F 13/245 |
| 2020/0160668 A1 * | 5/2020 | Berman | G07F 17/3293 |
| 2020/0168053 A1 * | 5/2020 | Berman | G07F 17/3258 |
| 2021/0097811 A1 * | 4/2021 | Berman | G07F 17/3262 |
| 2021/0113925 A1 * | 4/2021 | Imai | A63F 13/58 |
| 2022/0230509 A1 * | 7/2022 | Rodriguez | G07F 17/3248 |
| 2022/0392303 A1 * | 12/2022 | Lamb | G07F 17/3227 |
| 2022/0406148 A1 * | 12/2022 | Lamb | G07F 17/3293 |
| 2023/0018367 A1 * | 1/2023 | Imai | A63F 13/211 |

\* cited by examiner

GAMING DEVICES USING SUBSYMBOL BONUS FEATURE

This application is a continuation of U.S. application Ser. No. 17/682,729, filed Feb. 28, 2022, now U.S. Pat. No. 11,734,991, which is a continuation of U.S. application Ser. No. 16/989,323, filed Aug. 10, 2020, now U.S. Pat. No. 11,263,861, which is a continuation of U.S. application Ser. No. 15/911,687, filed Mar. 5, 2018, now U.S. Pat. No. 10,741,008, which claims the benefit of Provisional Patent Application No. 62/466,890, filed on Mar. 3, 2017, to which priority is claimed pursuant to 35 U.S.C. § 119(e) and which is incorporated herein by reference in its entirety.

FIELD OF THE INVENTION

Background

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever-wider selection of new games when visiting casinos and other gaming venues. Playing new games adds to the excitement of "gaming" As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate providing gaming devices with subsymbol driven bonus features. In one embodiment, a gaming device including a display and a processor is configured to randomly overlay or otherwise associate zero, one, or more subsymbols on game symbols used in a game of chance. When subsymbols appear on game symbols that are randomly determined to be part of the game outcome, a bonus feature is triggered that may be used to modify awards provided from the game outcome. In some embodiments, the presence of the subsymbols themselves act as a trigger for a secondary bonus feature or event, while in other embodiments, the subsymbols themselves may show random indicia within the subsymbol that provides a bonus modifier or other award.

DETAILED DESCRIPTION

Figure 1:
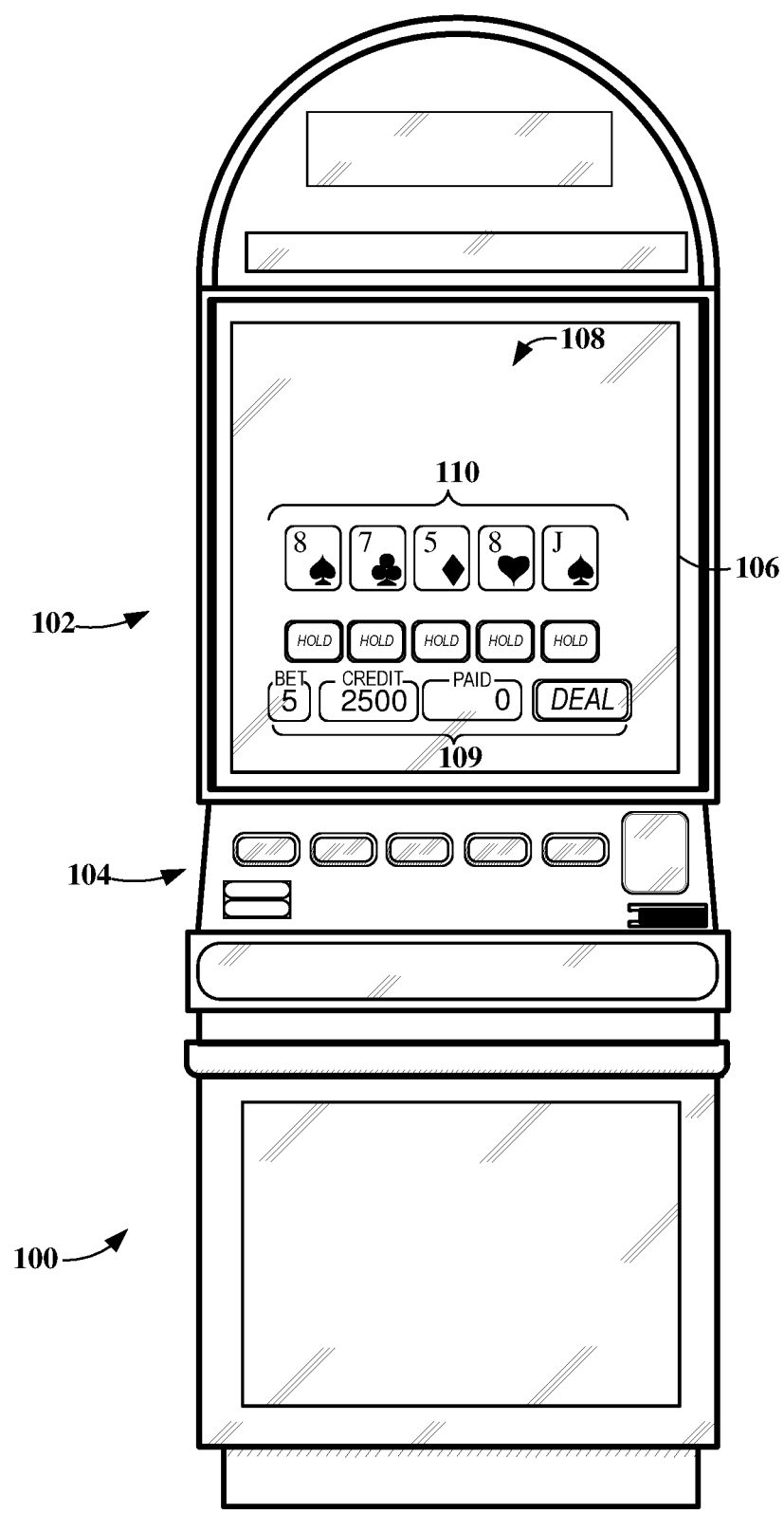
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

As described herein, the term "subsymbols" may generally refer to a secondary symbol that can be associated with a game symbol. Subsymbols may include letters, shapes, pictures, textures, colors, sounds, etc., and any combination therebetween that can be separately associated with game symbol. For example, a game symbol may refer to a virtual playing card, and a subsymbol may refer to an image of a wheel or a die that is placed on, overlaid, or otherwise associated with the virtual playing card. In another example, a game symbol may refer to a bar symbol in a slot game that appears on a game reel, and a subsymbol may be a word "bonus" that is placed on, overlaid, or otherwise associated with the bar slot symbol. The subsymbols may be fixed with respect to the underlying game symbol, or may be dynamically added or removed to one or more game symbols during game play. For example, in a video poker game, the game symbols may include a deck of virtual playing cards, and a game processor may randomly determine prior to dealing a hand of virtual poker cards one of the cards to overlay a "star" subsymbol. In this example, if the virtual card with the star subsymbol is dealt as part of the poker hand, a bonus feature may be initiated such as randomly determining a multiplier to use with the poker game, making the underlying virtual card wild, adding bonus credits to any award won, or triggering any other type of bonus feature. The subsymbols may have a particular function or value that is separate from a game symbol that is associated with the subsymbol. Similarly, the game symbol may have a function or value that is separate from the subsymbol that is associated with it. In the above example of the poker game, suppose a "star" subsymbol is randomly associated with the Jack of Diamonds playing card for the played poker hand. An image of a star may be placed or overlaid on the Jack of Diamonds if the Jack of Diamonds is dealt as part of the poker hand. However, the Jack of Diamonds may still function as a card with the rank of jack and the suit of diamonds for poker hand evaluation purposes, while the star subsymbol may represent a random multiplier of 2×, 3×, 5×, or 10× being used to modify any awards from the poker hand evaluation.

In some embodiments, the subsymbol may be associated with an underlying symbol during game play or after an initial result is shown on the game display. That is, for example, a subsymbol may be associated with a symbol on a spinning reel while the reel is spinning (that is, after the game has been initiated, but before the result of that reel spin is shown). Alternatively, a subsymbol may, for example, be overlaid on a card symbol after a hand of cards has been dealt.

Generally, systems, apparatuses and methods are described for implementing subsymbol driven features in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. slot game) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that utilizes operations of facilitate providing gaming devices with subsymbol driven bonus features. In one embodiment, a gaming device including a display and a processor is configured to randomly overlay zero, one, or more subsymbols on game symbols used in a game of chance. When subsymbols appear on game symbols that are randomly determined to be part of the game outcome, a bonus feature is triggered that may be used to modify awards provided from the game outcome. In some embodiments, the presence of the subsymbols themselves act as a trigger for a secondary bonus feature or event, while in other embodiments, the subsymbols themselves may show random indicia within the subsymbol that provides a bonus modifier or other award.

In embodiments where the presence of one or more subsymbols triggers a bonus, some of the embodiments include subsymbols that trigger a bonus merely by appearing on an associated game symbol that is part of a game outcome, while other of the embodiments utilize a particular combination of subsymbols appearing on respective associated game symbols that are part of the game outcome. For example, two subsymbols may be used during game play, where a first subsymbol is a lock and a second subsymbol is a key. If game symbols appear as part of the game outcome that have either the lock subsymbol or the key subsymbol, but both of the subsymbols are not shown in the game outcome, no bonus may be triggered. However, if both the lock subsymbol and the key subsymbol are associated with game symbols that are shown on a game display as part of a game outcome, a bonus or other feature may be triggered.

In other embodiments, the subsymbols themselves may be the bonus feature, where parts of the subsymbol are used to determine what the feature provides. For example, in a video poker embodiment where the subsymbols are dice, one or two dice may be randomly associated with respective virtual playing cards, where the subsymbols can appear to show any one of the six faces of the dice with 1 through 6 pips. The side of the die for each subsymbol may also be randomly selected during game play so that if a virtual playing card with one of the dice subsymbols is dealt to the poker hand, the player receives a multiplier equal to the number of pips shown on the random face of the dice. In some embodiments, the side of the die is randomly selected prior to the cards being dealt. In other embodiments, an image of the die is shown on the cards, where the die is randomly rolled if it appears on a card that is dealt to the poker hand to determine a face of the die to show, and consequently which multiplier value is awarded from the subsymbol bonus feature.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display area 102 (also referred to as a gaming display), and a player interface area 104, although some or all of the interactive mechanisms included in the user interface area 104 may be provided via graphical icons used with a touch screen in the display area 102 in some embodiments. The display area 102 may include one or more game displays 106 (also referred to as "displays" or "gaming displays") that may be included in physically separate displays or as portions of a common large display. Here, the game display 106 includes a primary game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player loyalty information to identify a user or player of the gaming device. This mechanism may be card reader, biometric scanner, keypad, or other input device. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touchscreen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In some the example embodiments illustrated herein, the primary gaming portion 108 may display a grid (or equivalent arrangement) of game elements 110 or game element positions (also referred to as "card positions" or "reel stop positions" herein). As illustrated in the embodiment shown in FIG. 1, the grid includes a row of five card positions for virtual playing card game elements 110, which may form a poker hand of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual symbols, or user controls over stopping or spinning reels. The game display 106 of the display area 102 may include other features that are not shown, such as paytables, navigation controls, etc.

Figure 2:
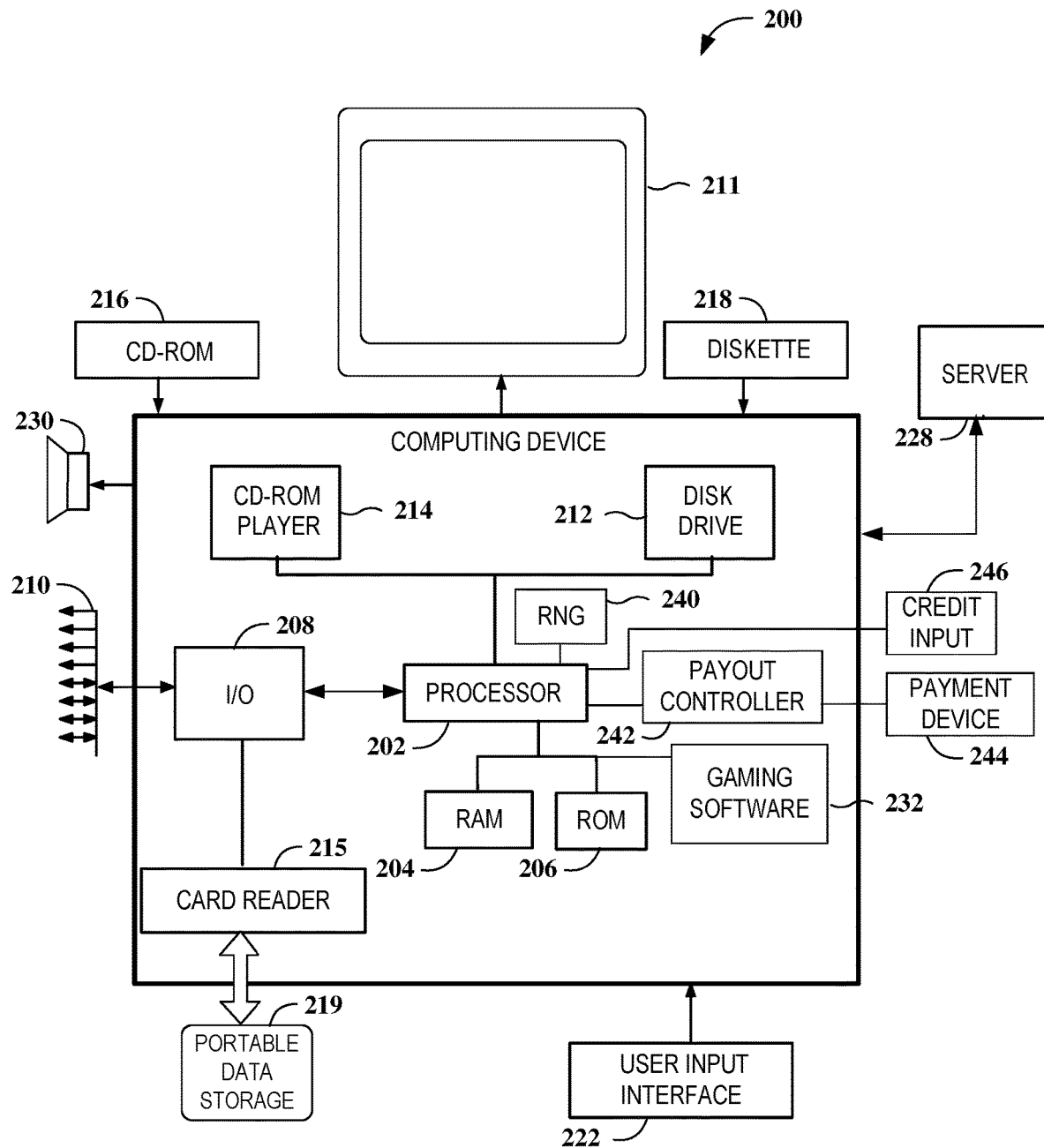
FIG. 2 is a block diagram illustrating a computing arrangement according to embodiments of the invention

Although FIG. 1 illustrates a particular implementation of some of the embodiments of this invention in a casino or electronic gaming machine ("EGM"), one or more devices may be programmed to play various embodiments of the invention. The present invention may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the invention is illustrated in FIG. 2.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 200 of FIG. 2 is an example computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions in accordance with the present invention typically includes a central processor (CPU) 202 coupled to random access memory (RAM) 204 and some variation of read-only memory (ROM) 206. The ROM 206 may also represent other types of storage media to store programs, such as programmable ROM (PROM), erasable PROM (EPROM), etc. The processor 202 may communicate with other internal and external components through input/output (I/O) circuitry 208 and bussing 210, to provide control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to the display 211, which represents a display on which the gaming activities in accordance with the invention are presented. The display 211 represents the "presentation" of the game information in accordance with the invention, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands into the computing arrangement 200, such as placing wagers or initiating gaming events on the computing arrangement 200, inputting currency or other payment information to establish a credit amount or wager amount, or inputting data to identify a player for a player loyalty system. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs may be implemented using hardware, software operable in connection with the processor 202, or some combination of hardware and software. The present invention is operable using any known RNG, and may be integrally programmed as part of the processor 202 operation, or alternatively may be a separate RNG controller 240. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 indicating a payout is to be made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout device 244 may also be provided in gaming machine embodiments, where the payout device 244 serves as the mechanism providing the payout to the player or participant. In some embodiments, the payout device may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency. In yet other embodiments, the payout device 244 may send a signal via the network server 228 or other device to electronically provide a credit amount to an account associated with the player, such as a credit card account or player loyalty account. The computing arrangement 200 may also include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, etc., for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payout device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described hereinabove. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 232 may include instructions to provide other functionality as known in the art or as described and shown herein.

Embodiments of the invention include gaming devices, such as those described above that are configured to implement a subsymbol bonus feature. The subsymbol bonus feature may be implemented in a variety of manners to enhance the game play of the gaming device and the enjoyment of the player. One of the challenges of implementing embodiments in some video poker games that include multiple rounds, such as draw poker, hold 'em poker, etc. is that the presence of subsymbols may affect the typical play strategy of the games. That is, if the subsymbols are simply assigned to cards in the deck and no subsymbols are included on the playing cards initially dealt, a player may change her poker strategy from an optimum or known strategy to try to get more cards on a draw or second round. For example, in a draw poker game, if a player receives 2H, 4H, 7H, 10H, 2D, but none of the cards have a subsymbol, the player may hold the 2H and 2D to try and have three chances of getting the subsymbol on one of the cards in the draw instead of holding the 2H, 4H, 7H, and 10H (which is typically a better play in going for the flush hand) because she will have only one chance to get a card with a subsymbol on the draw. Since a change in strategy can be viewed as complicated and unattractive to certain players, a video poker gaming device may be configured according to embodiments of this invention to remove this change of strategy element.

For example, in some embodiments, a video poker game uses standard poker cards that can have a subsymbol placed on, assigned to, or otherwise associated with a card. If the card with the subsymbol appears, it triggers a bonus feature. In this example embodiment, there are two decks of virtual cards used, Deck 1 and Deck 2. Prior to the deal, a table may be used to decide if a subsymbol is placed on a single random card in Deck 1. Cards are dealt from Deck 1. If the card with a subsymbol is dealt, then the feature is initiated. If the card with a sub-symbol was placed in Deck 1, but the card with a sub-symbol was not dealt, then the following 6-step process occurs after cards are held:

1) The subsymbol is removed from the card in Deck 1.
2) A table is used to decide if a subsymbol is placed on a single random card in Deck 2.
3) The cards in Deck 2 that match the non-held dealt cards are removed from Deck 2.
4) If any cards in Hand 1 match the card with a subsymbol from Deck 2 including the held cards, then the matching card with the sub-symbol from Deck 2 replaces the matching card from Hand 1, and the bonus feature is initiated.

5) If any cards in Hand 1 match cards in Deck 2, they are removed from Deck 2.
6) The remaining cards for Hand 1 are dealt from Deck 2. If the card with a subsymbol is dealt, then the bonus feature is initiated.

If the bonus feature includes a bonus wheel to randomly determine a multiplier to use with any awards from the poker hand evaluation, then the final pays from the poker hand are multiplied by the multiplier determined from the bonus feature. There are many possible variations and other embodiments possible that are included in the scope of this inventive concept. For example, the above rules limited 1 card to appear on Hand 1 either before holding, or after holding. However, in other embodiments, it is possible to set up the rules so that multiple cards with the subsymbol can appear, multiple subsymbols occur on the same card, or that they appear on different hands. The subsymbol can be used in different ways. For example, multiple subsymbols could upgrade the range of multiplier possible in the bonus feature.

In one example embodiment, a single subsymbol is randomly placed on a card in a video draw poker game. Here, Deck 1 is used to deal cards, and a secondary comparison Deck 2 is used to decide whether to place a feature triggering subsymbol after the cards are held. Prior to the deal, a first table is used to decide if a subsymbol is placed on a single random card in Deck 1. Cards are then dealt from Deck 1. If the card with the associated subsymbol is dealt, then the bonus feature is initiated. If the subsymbol was placed in Deck 1 via the first table, but the card with the subsymbol was not dealt, then the following process occurs after the cards are held:

1) The subsymbol is removed from the card in Deck 1
2) A second table is used to decide if a sub-symbol is placed on a single random card in the second Deck.
3) If the held cards in the poker hand or any card drawn to the poker hand (replacement cards) after the hold match the card with the subsymbol in Deck 2, then the matching card in the poker hand gains a subsymbol and the bonus feature is initiated.

In another example embodiment using 2 subsymbols placed on the cards, Deck 1 may be used to deal cards, and a secondary comparison Deck 2 is used to decide whether to place a feature triggering subsymbol after the cards are held. Prior to the deal, a first table is used to decide if a subsymbol is placed on two unique random cards in Deck 1. Cards are dealt from Deck 1. If both cards with a subsymbol would be dealt, then one of the subsymbols is randomly removed. If a card with a subsymbol is dealt, then the bonus feature is initiated. If subsymbols were placed in Deck 1 via the first table, but a card with a subsymbol was not dealt, then the following process occurs after cards are held:

1) The subsymbols are removed from the card(s) in Deck 1.
2) A second table is used to decide if a subsymbol is placed on two unique random cards in Deck 2.
3) If the held cards in in the poker hand or any card drawn to the poker hand (replacement cards) after the hold match either of the cards with a subsymbol in Deck 2, then a single random matching card in the poker hand from Deck 1 gains a subsymbol and the bonus feature is initiated.

Alternatively, if more than one matching subsymbol is present in the dealt hand from Deck 1, or after the draw from Deck 1 and/or Deck 2, both subsymbols may be kept and shown on the cards. Here, having both subsymbols appear in the poker hand may add something extra to the bonus feature, or the bonus feature may be triggered twice.

Figure 3:
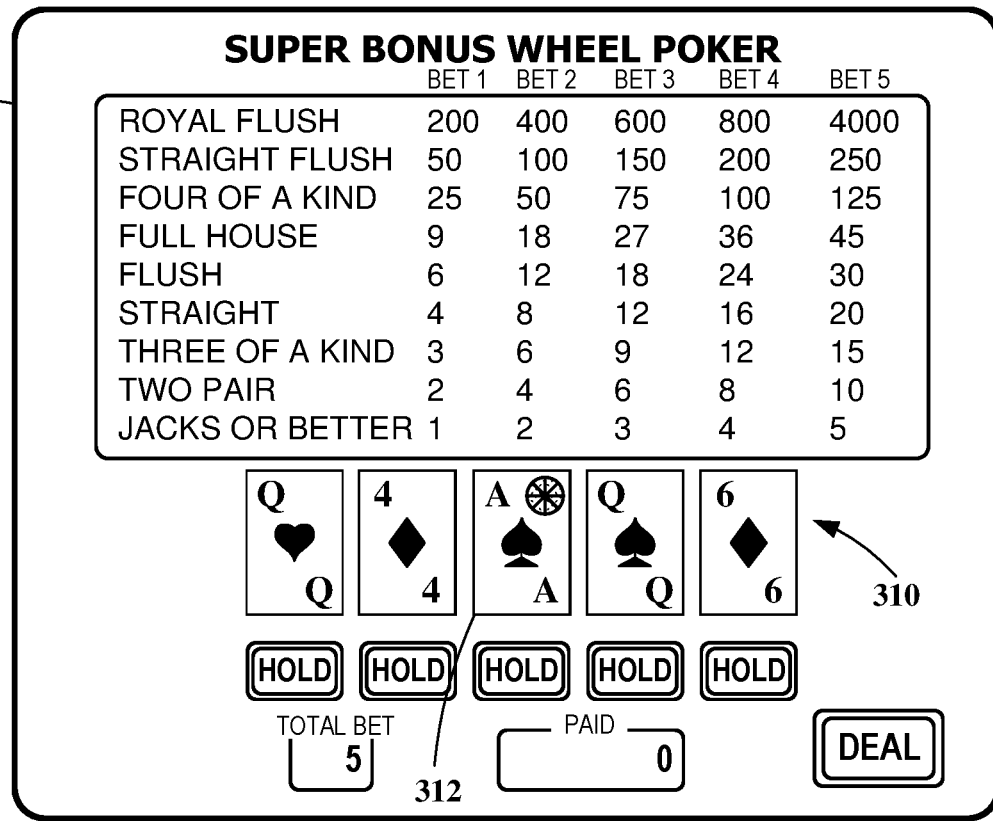
FIG. 3 is a diagram of a gaming display showing a subsymbol feature implemented in a video poker game according to embodiments of the invention.

FIG. 3 is a diagram of a gaming display showing a subsymbol feature implemented in a video poker game according to embodiments of the invention. Referring to FIG. 3, a game display 300 includes a poker hand of cards 310 that includes a card 312 with a subsymbol overlaid, placed, or otherwise associated with that card. Here, the Ace of Spades includes a wheel subsymbol indicating that a wheel bonus feature is triggered.

Figure 4A:
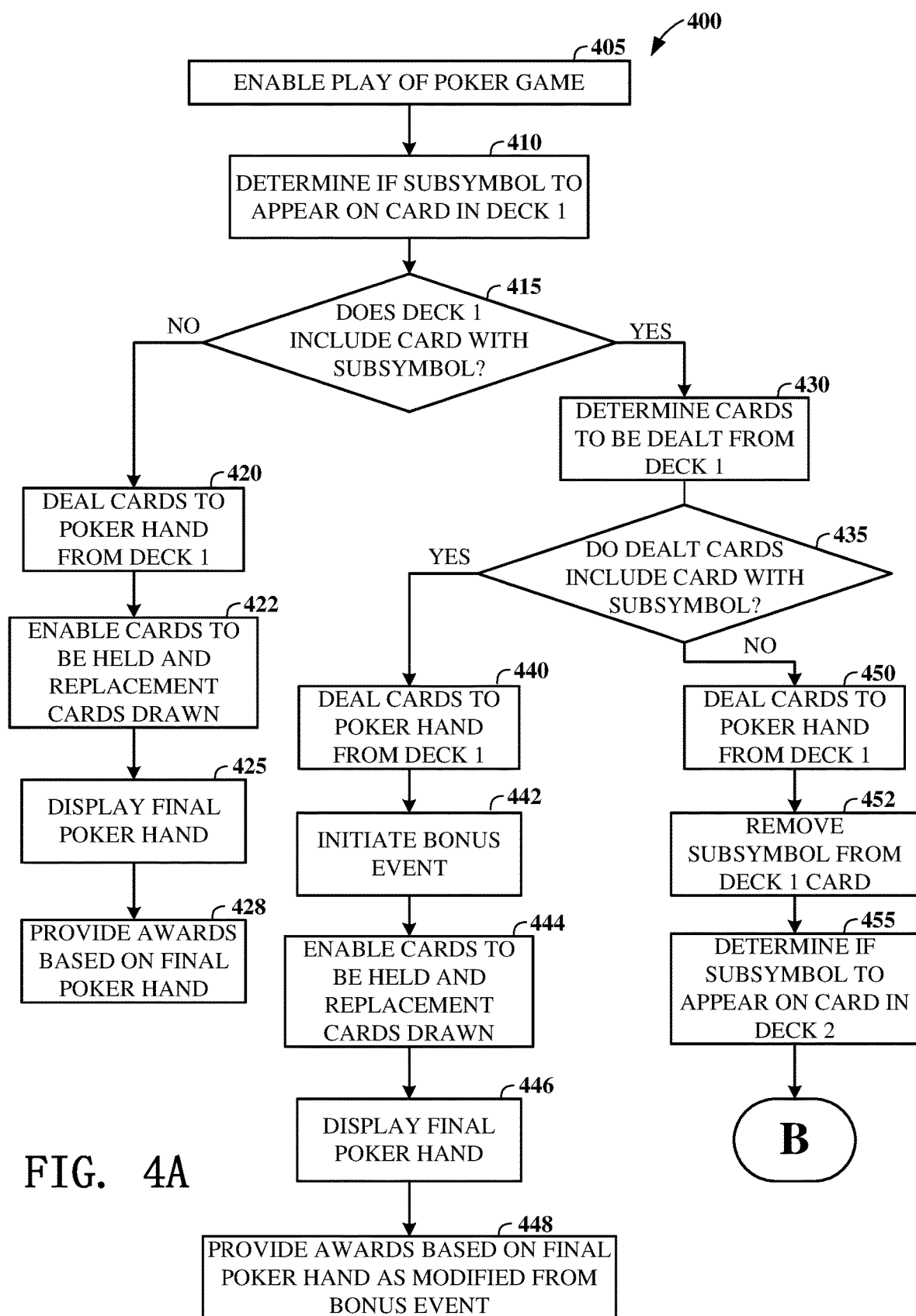
FIGS. 4A and 4B are parts of a flow diagram showing a method of operating a gaming device using subsymbols according to embodiments of the invention.
Figure 4B:
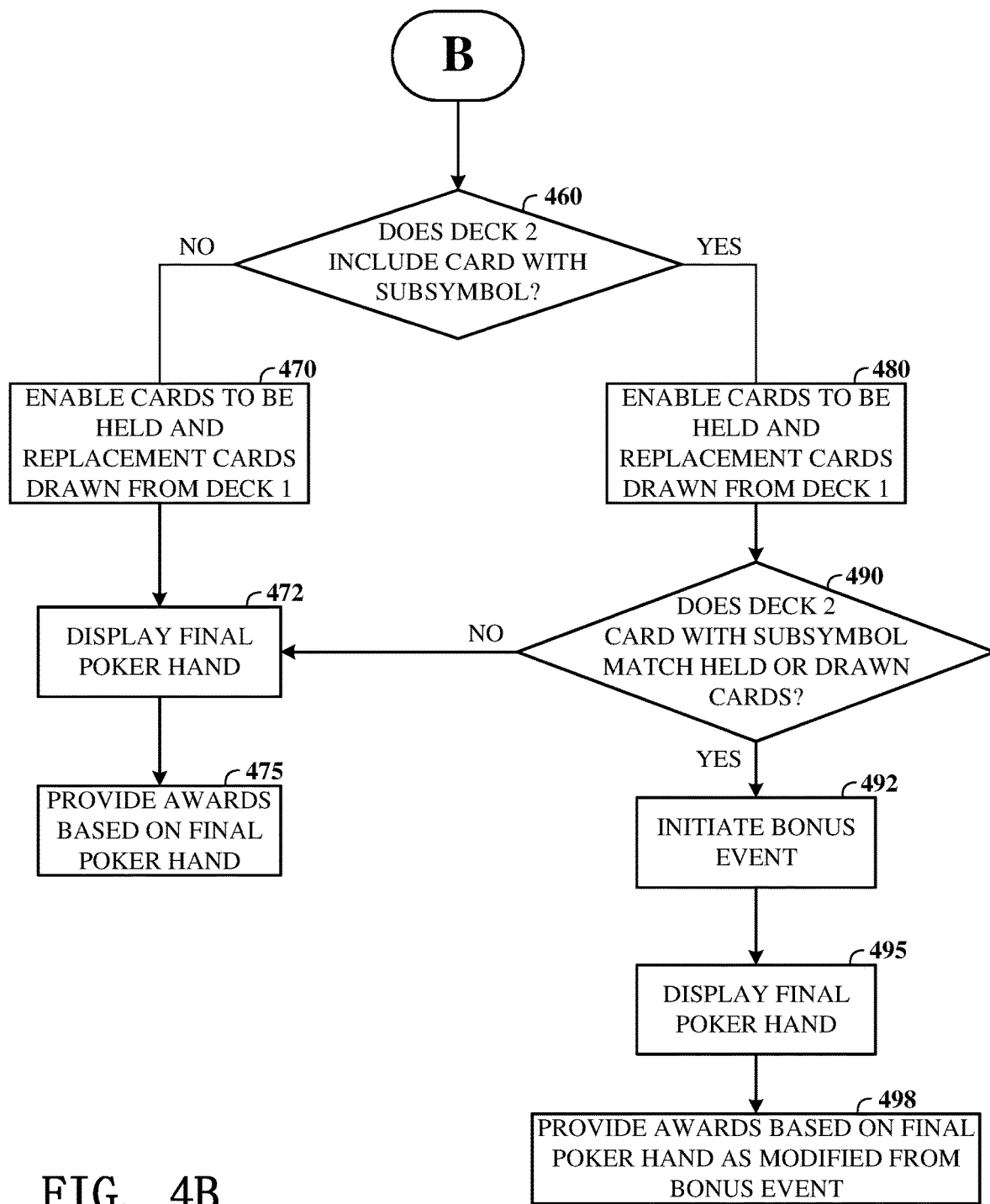

FIGS. 4A and 4B are flow diagrams representing methods in which a gaming device and/or gaming system can be operated according to embodiments of the invention. Although various processes are shown in a particular order in these flow diagrams, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device. Note that these example methods are just some embodiments of how the steps of a game operation can be implemented. As discussed and shown above, many variations exist which may require additional, fewer, or different processes to complete.

Referring to FIGS. 4A and 4B, flow 400 begins at process 405 where play of a poker game is initiated. In process 410, it is determined if one or more subsymbols randomly appear on (i.e., are associated with) one or more respective cards is a first deck of cards, Deck 1. In some embodiments, the determination here may be fixed. That is, one subsymbol is always assigned to a card in the deck of cards. In other embodiments, this determination process may include determining if one subsymbol will be assigned to the one of the cards in the deck cards, or whether no cards will have an associated subsymbol. In yet other embodiments, this determination process may include whether zero, one, or more cards are assigned a subsymbol. In still other embodiments, this determination process may include determining what type of subsymbol to associate to the randomly selected card(s). This may happen in embodiments where, for example, multiple types of subsymbols are possible.

In process 415, it is determined if Deck 1 includes at least one card associated with a subsymbol. If Deck 1 is determined to have no subsymbols associated with any card, flow 400 proceeds to process 420 where the cards are dealt to a poker hand from Deck 1. The cards may then be held and replacement cards drawn in process 422, to display a final poker hand in process 425. Awards are then provided in process 428 based on an evaluation of the final poker hand with respect to a paytable. Returning to process 415, if it is determined that Deck 1 does include at least one card with an associated subsymbol, flow 400 proceeds to process 430 to determine which cards from Deck 1 are to be dealt. In process 435, it is determined if any of the cards to be dealt are associated with a subsymbol. If one or more of the cards to be dealt is associated with a subsymbol, flow 400 proceeds to process 440 where the determined cards are dealt to the poker hand. As the subsymbol is now shown as associated with one of the dealt cards, flow 400 proceeds to process 442 where the bonus feature or event is initiated. In process 444, the cards are enabled to be held and replacement cards drawn for any non-held cards. In process 446, the final poker hand is displayed, and in process 448, awards are provided from an evaluation of the final poker hand as modified from the bonus event. Here, for example, if the bonus event determined a multiplier, any award associated with the poker hand from a paytable is multiplied by the multiplier determined from the bonus event. In another example, if the bonus event determined a bonus card, that bonus card may be used in evaluating the final poker hand with the paytable. That is, the best five card hand from the six cards (the five from the final hand and the one bonus card) may be used to determine awards.

Returning to process 435, if the dealt cards do not include a card associated with a subsymbol (but at least one card in Deck 1 is associated with a subsymbol), flow 400 proceeds to process 450 where the determined cards are dealt to the poker hand from Deck 1. The subsymbol is then removed from the Deck 1 card that is was initially assigned to in process 452 and a determination is made in process 455 as to whether a subsymbol is to appear on at least one card in Deck 2. Process 455 may include similar steps to process 410 described above, or may include a different variation of the embodiments described above with respect to process 410. Flow 400 then proceeds to step 460 (shown in FIG. 4B) to determine if Deck 2 includes a card with a subsymbol. If Deck 2 does not include a card associated with a subsymbol, flow 400 proceeds to process 470 where the cards in the poker hand are enabled to be held and replacement cards drawn. In process 472 the final poker hand is displayed based on the cards held and the replacement cards drawn, and awards are provided after evaluating the final poker hand with respect to a paytable in process 475.

Returning to process 460, if Deck 2 does include at least one card with a subsymbol, flow 400 proceeds to process 480 where the cards are enabled to be held and non-held cards are discarded in favor of replacement cards. In process 490, it is determined whether the card(s) with the subsymbol(s) in Deck 2 match any held cards in the poker hand or if they are the replacement cards that will be drawn to the poker hand to replace the discarded non-held cards. In some embodiments, process 490 may be implemented after displaying the final poker hand with the replacement cards, but as shown in FIG. 4B this process is completed prior to showing the replacement cards and final hand. This may build anticipation in the player as the bonus event may yield a large multiplier or other attractive bonus modifier and the final poker hand may not yet be completely known (although it would if all cards were held from the dealt hand—but that usually only happens if the dealt hand includes a winning poker hand already associated with an award from the paytable). If it is determined in process 490 that the card(s) in Deck 2 associated with a subsymbol do not match the held cards in the poker hand, and will not be the replacement cards drawn, flow 400 proceeds to process 472 and process 475 to display the final poker hand and provide awards based on that final poker hand. If, on the other hand, it is determined in process 490 that the card (s) in Deck 2 associated with a subsymbol does match the held cards in the poker hand and/or will be included in the replacement cards drawn, flow 400 proceeds to process 492 where the bonus event is initiated. In some embodiments, the bonus event may be initiated after the final poker hand is displayed, but in this embodiment shown in these figures, the final poker hand is displayed in process 495 after the bonus event is initiated to build player anticipation. After the final poker hand is displayed, awards based on the final poker hand as modified by the outcome of the bonus event are provided in process 498.

Figure 5A:
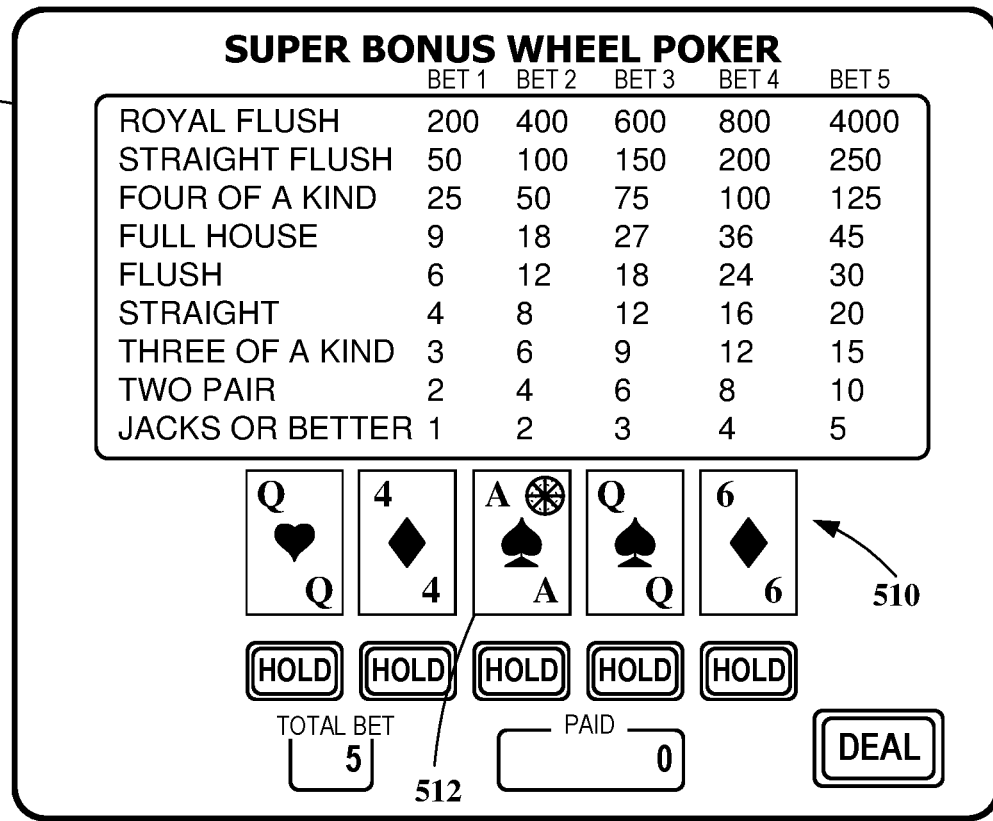
FIGS. 5A and 5B are diagrams of a gaming display showing a progression of game events using subsymbols according to embodiments of the invention.
Figure 5B:
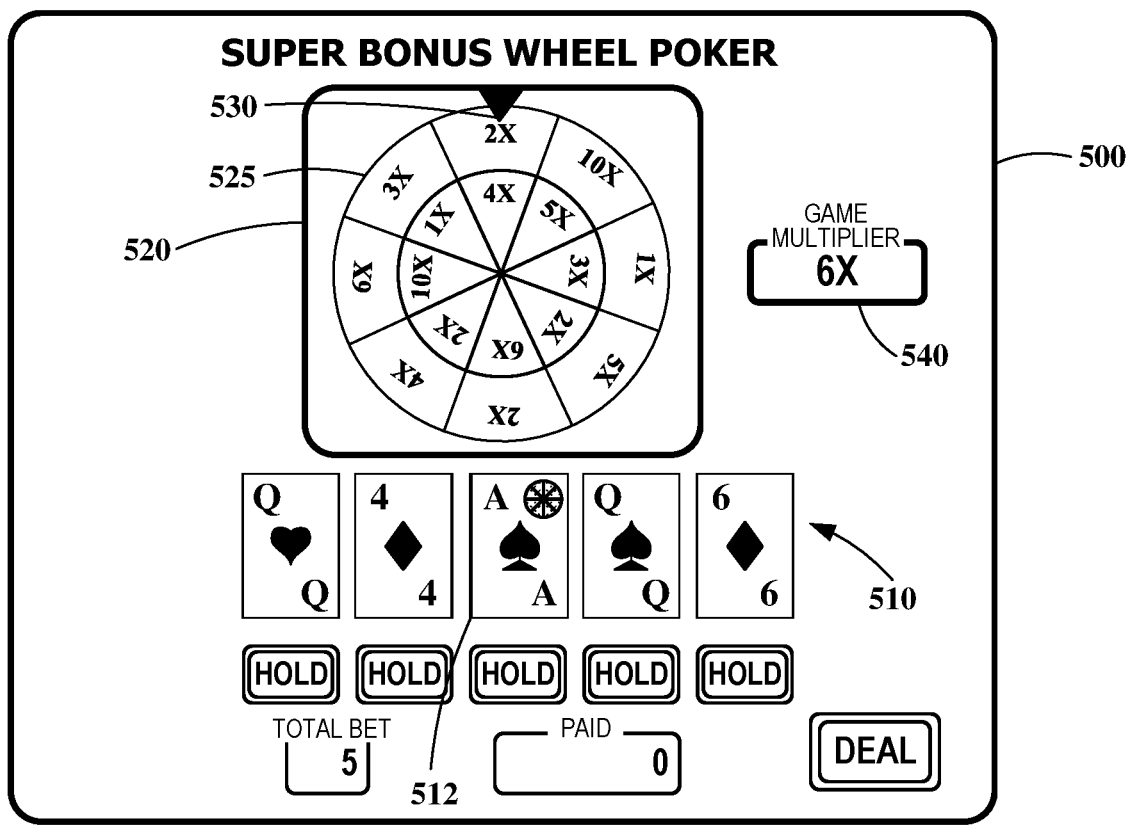

FIGS. 5A and 5B are diagrams of a gaming display showing a progression of game events using subsymbols according to embodiments of the invention. Referring to FIG. 5A, a game display 500 includes a poker hand of cards 510 that includes a card 512 with a subsymbol overlaid, placed, or otherwise associated with that card. Here, the Ace of Spades includes a wheel subsymbol indicating that a wheel bonus feature is triggered. In FIG. 5B a bonus wheel feature is shown on the game display 500. Here, a bonus window 520 shows concentric bonus wheels 525 that individually spin to determine a bonus multiplier value. Here, an indicator 530 shows that a "2×" and "4×" multipliers were awarded from the bonus wheels 525. These multipliers are then summed and shown in the Game Multiplier meter 540 as "6×." Thus, any awards won in the poker game will be multiplied by 6×. As shown in FIG. 5B, just based on the cards dealt, the player can hold the pair of Queens and be guaranteed an award of at least something multiplier by 6× (assuming Jacks or better pairs pay in the paytable). However, the player can improve this poker hand on the draw and potentially get 3-of-a-kind Queens or 4-of-a-kind Queens with larger award values that will be multiplied by the 6× from the bonus feature. In other embodiments, the multipliers may be multiplied together. Here, in a similar circumstance to that described above, a total multiplier may be 8× as the received "4×" and "2×" multipliers are multiplied together. In yet other embodiments, other methods may be used to combine multiple subsymbol award or modification values, such as giving the greater of the values presented, giving the average or mean value of the values presented, etc.

Figure 6A:
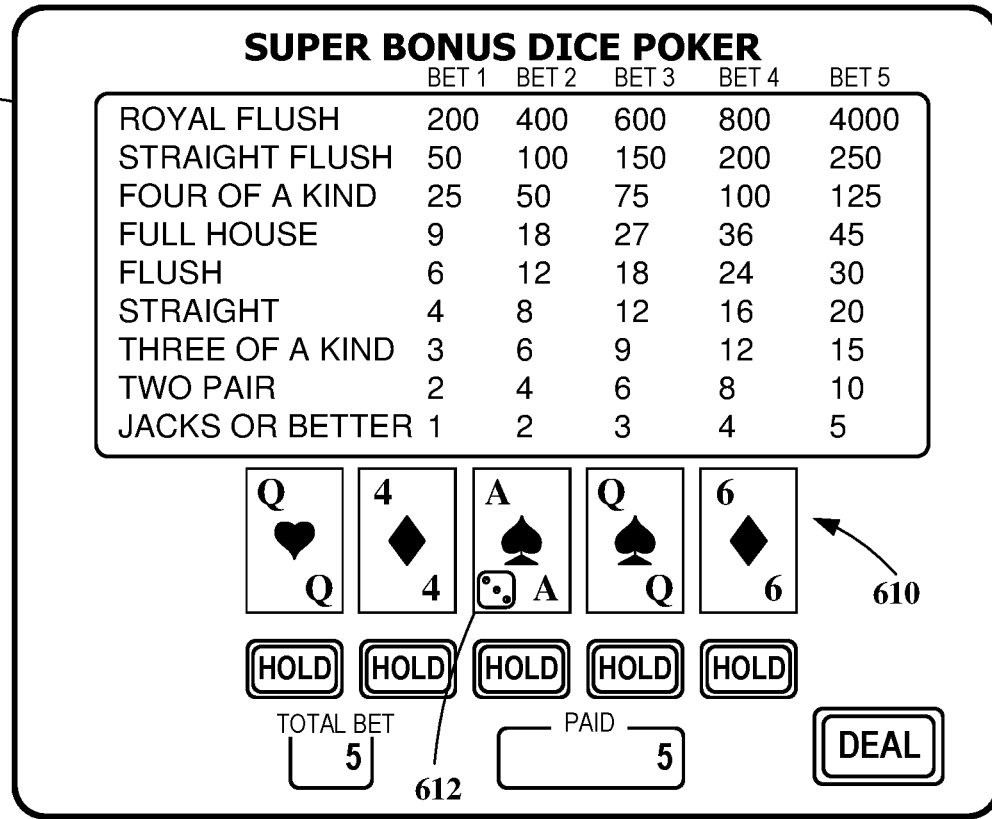
FIGS. 6A and 6B are diagrams of a gaming display showing another progression of game events using subsymbols according to embodiments of the invention.
Figure 6B:
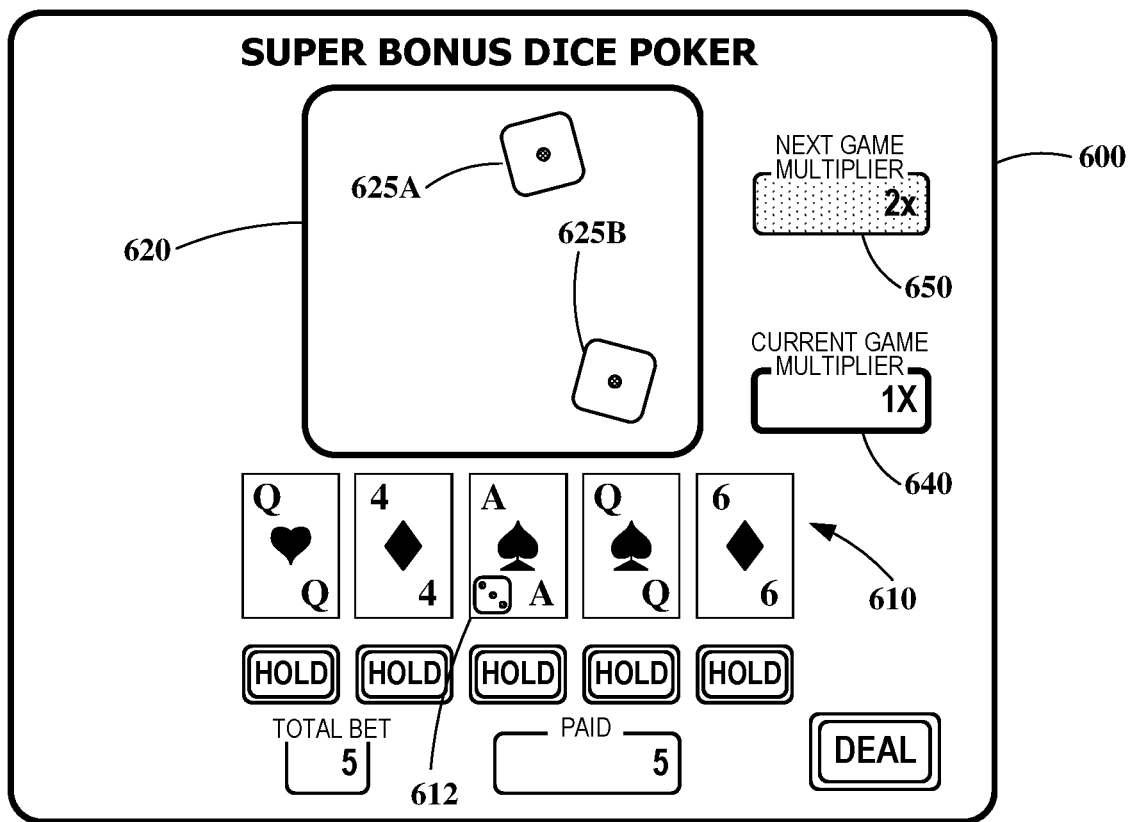

FIGS. 6A and 6B are diagrams of a gaming display showing another progression of game events using subsymbols according to embodiments of the invention. Referring to FIG. 6A, a game display 600 includes a poker hand of cards 610 that includes a card 612 with a subsymbol overlaid, placed, or otherwise associated with that card. Here, the Ace of Spades includes a die subsymbol indicating that a dice bonus feature is triggered. In FIG. 6B a bonus window 620 is shown on the game display 600 where a dice bonus game is provided. Here, two dice 625A and 625B are rolled and the outcome of the roll is used to determine a bonus multiplier for the next played poker game. That is, the 2× multiplier shown in the Next Game Multiplier meter 650 will be applied to the next played poker game instead of the current game. A Current Game Multiplier Meter 640 may also be shown on the game display. Here, the current poker game does not have a bonus multiplier.

Figure 7:
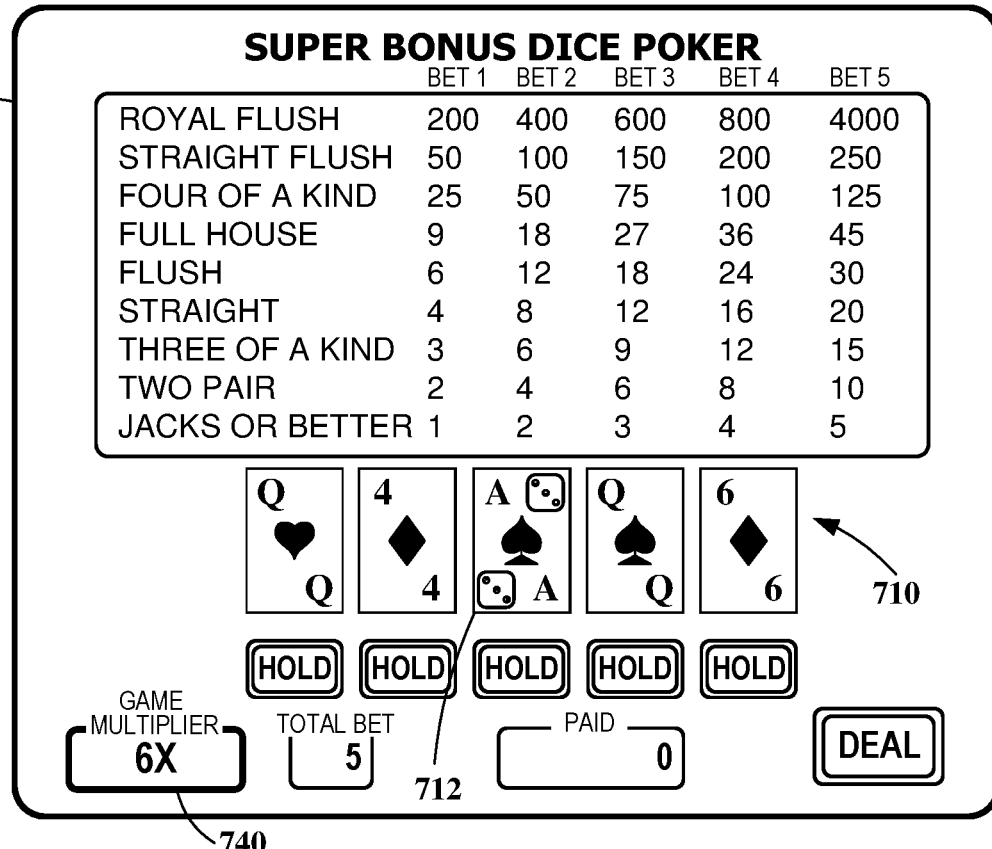
FIG. 7 is a diagram of a gaming display showing another subsymbol feature implemented in a video poker game according to embodiments of the invention.

FIG. 7 is a diagram of a gaming display showing another subsymbol feature implemented in a video poker game according to embodiments of the invention. Referring to FIG. 7, a game display 700 includes a poker hand of cards 710 that includes a card 712 with subsymbols overlaid, placed, or otherwise associated with that card. Here, the Ace of Spades includes two dice subsymbols that are used to generate a bonus award value. That is, in this embodiment, zero, one, or two dice subsymbols may appear on a playing card in the deck of cards. In addition to determining whether the dice subsymbols will appear on a card, and which card they will appear on, a further random determination is made as to what side of the dice to show. This random determination of which side of the dice to show may be made before the cards are dealt, so they are dealt in this embodiment with the two dice each showing 3 pips, or they may be dealt with a generic dice image or dice face and then roll once the cards are dealt to enhance player anticipation of what the bonus value may be. In this embodiment, as both dice are shown with the sides having 3 pips up, the player is awarded a "6×" multiplier, which is shown in the Game Multiplier Meter 740.

Figure 8A:
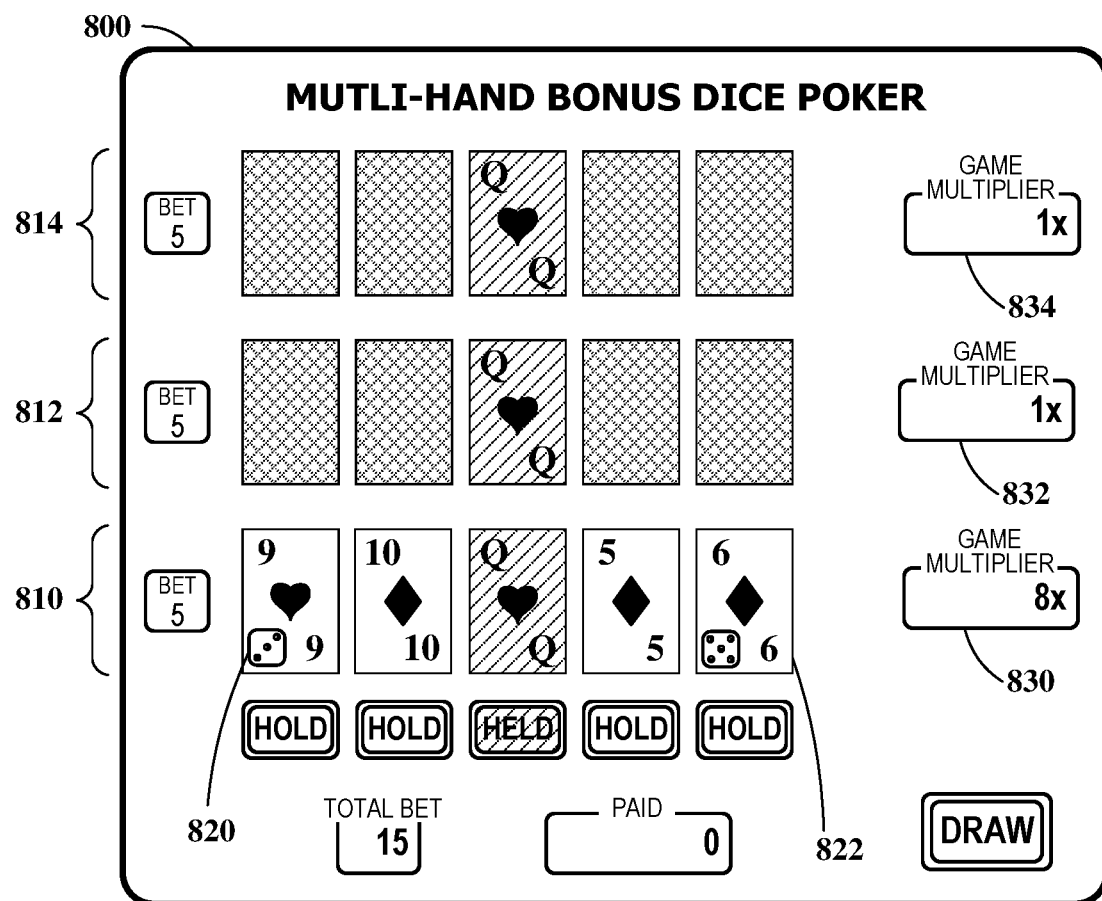
FIGS. 8A and 8B are diagrams of a gaming display showing another progression of game events using subsymbols according to embodiments of the invention.
Figure 8B:
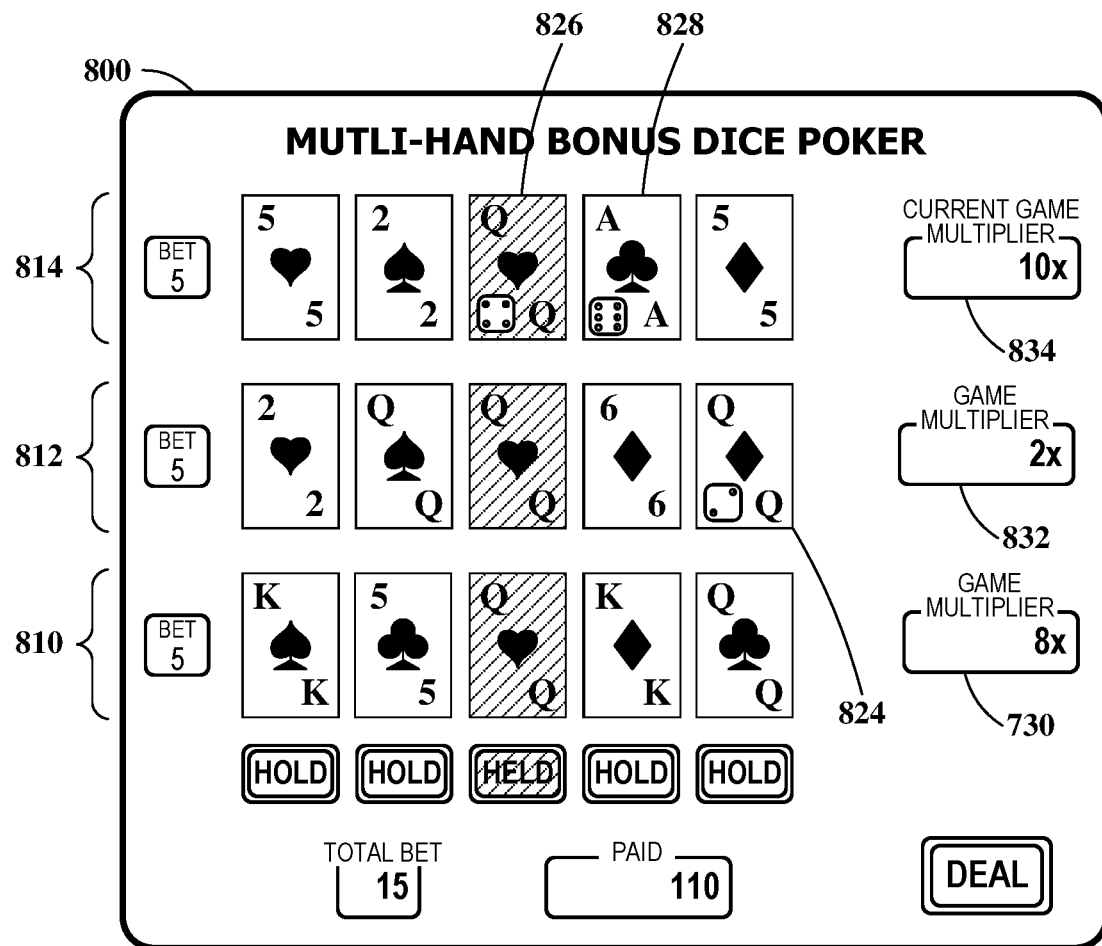

FIGS. 8A and 8B are diagrams of a gaming display showing another progression of game events using subsymbols according to embodiments of the invention. Referring to FIG. 8A, a game display 800 includes a multi-hand poker game where a first poker hand 810, second poker hand 812, and third poker hand 814 are shown on the display. Cards are initially only dealt to the first poker hand 810, and cards held in the first poker hand are then replicated in the second poker hand 812 and third poker hand 814, as shown in FIG. 8A. Additionally, the game display 800 includes a first Game Multiplier Meter 830 associated with the first poker hand 810, a second Game Multiplier Meter 832 associated with the second poker hand 812, and a third Game Multiplier Meter 834 associated with the third poker hand 814. Here, the first dealt poker hand included two cards 820 and 822 with associated subsymbols. Additionally, the player has held the Queen in the first poker hand 810, which has been replicated in the second poker hand 812 and third poker hand 814. Since the first poker hand included cards associated with subsymbols 820, 822, the first Game Multiplier Meter 830 has been modified to show the current game multiplier for the first poker hand of "8×."

In FIG. 8B, the player has discarded the non-held cards and drawn new replacement cards in the first poker hand 810. This also includes dealing cards to the remaining open spots in the second poker hand 812 and third poker hand 814. As shown in FIG. 8B, the second poker hand 812 now includes a card 824 with a subsymbol of die showing 2 pips. The second Game Multiplier Meter 832 is updated to reflect this die value of "2×." Also shown in FIG. 8B is the third poker hand 814 that now includes a card 826 with a dice subsymbol showing a side with four pips and a card 828 with a dice subsymbol showing a side with six pips. Here, the third Game Multiplier Meter 834 to reflect the sum of these dice values of "10×." Note, that a process similar to the one discussed above is used to determine whether the cards held and drawn receive an associated subsymbol. Here, the card referenced by 826 was originally held and did not have a subsymbol associated with it based on the deal. However, after the replacement draw, it is now associated with a dice subsymbol. Hence, if the process used was the same as described above with respect to FIGS. 4A and 4B, a determination was made in a second deck of cards that the Queen of Hearts was to be associated with a subsymbol. Additionally, as shown in this embodiment, separate decks of cards may be used to determine the draw cards for each poker hand 810, 812, 814 and for the determination of whether subsymbols will be associated (and which cards to be associated with) with cards in each poker hand. That is, for this three-hand game, six separate decks of cards may be used. In other embodiments, however, less decks may be used for the draw and/or subsymbol determinations.

Figure 9:
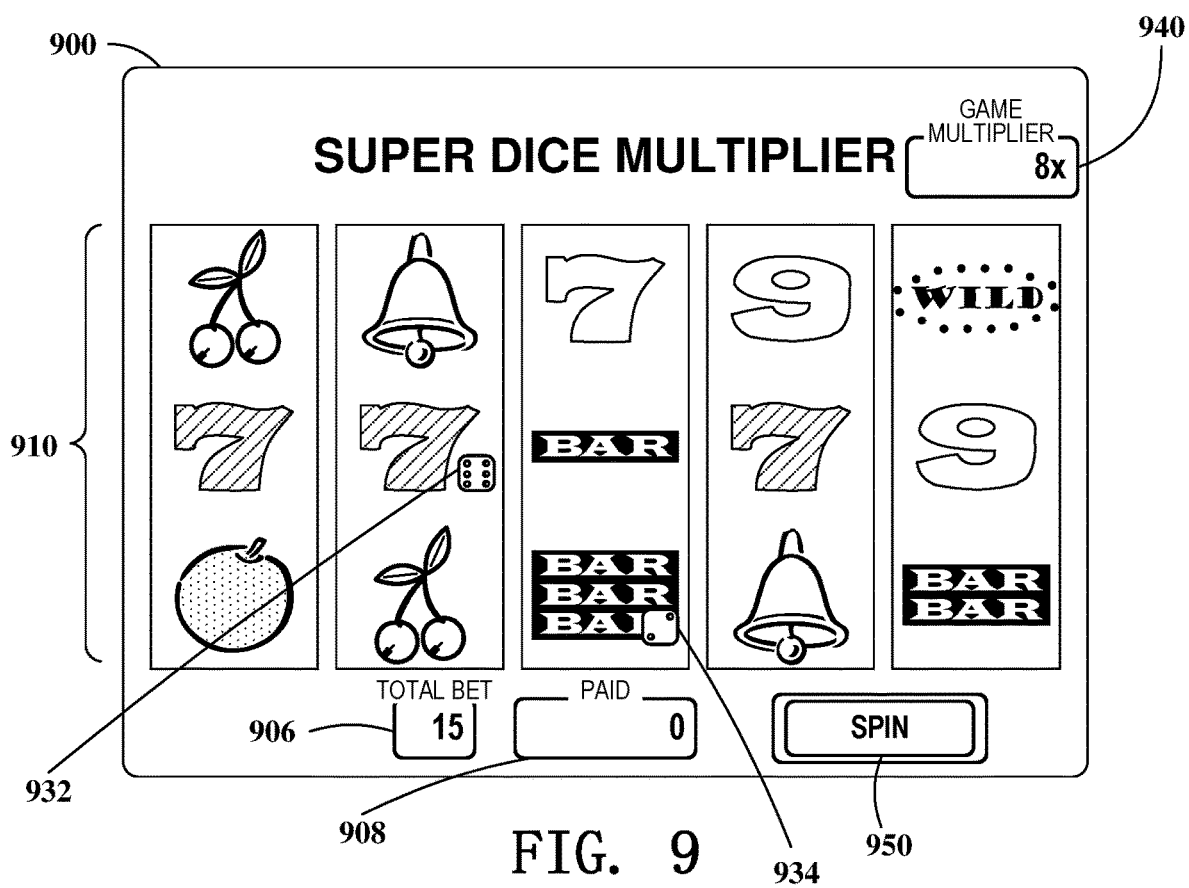
FIG. 9 is a diagram of a gaming display showing another subsymbol feature implemented in a spinning reel game according to embodiments of the invention.

FIG. 9 is a diagram of a gaming display showing another subsymbol feature implemented in a spinning reel game according to embodiments of the invention. Referring to FIG. 9, a game display 900 includes a game grid 910 of game symbols, a Total Bet Meter 906, a Paid Meter 908, a SPIN Button 950 and a Game Multiplier Meter 940. Here, the game reels have been spun and have come to a rest in the game grid 910. Two of the game symbols 932 and 934 in the game grid are associated with dice subsymbols. In this embodiment, the values shown on the faces of any dice subsymbols that appear on the game grid 910 as a game outcome are combined to give a game multiplier. As shown in the Game Multiplier Meter 940, the dice subsymbols of six pips and two pips are combined to give an "8×" game multiplier. However, as no winning game combinations of game symbols were received as part of the game outcome, no awards are provided as shown by the Paid Meter 908.

Figure 10A:
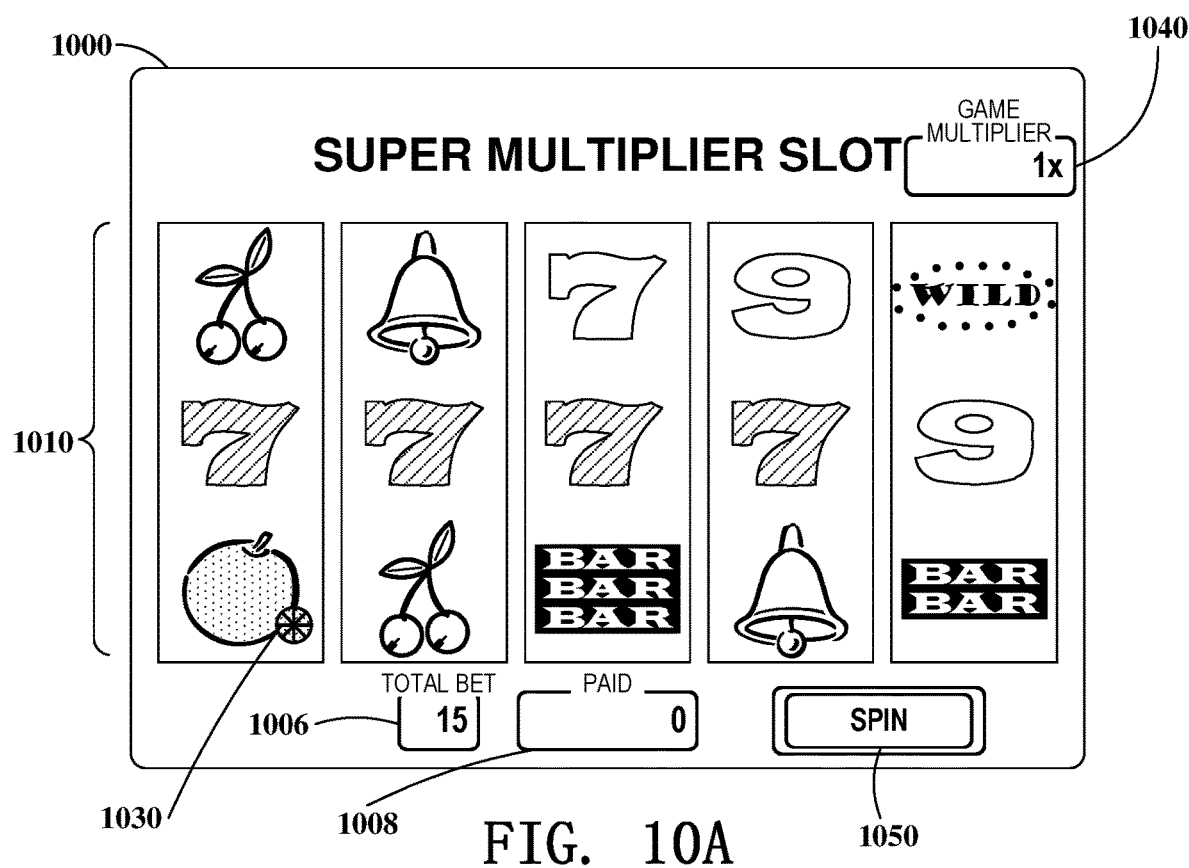
FIGS. 10A, 10B, 10C, and 10D are diagrams of a gaming display showing another progression of game events using subsymbols according to embodiments of the invention.
Figure 10B:
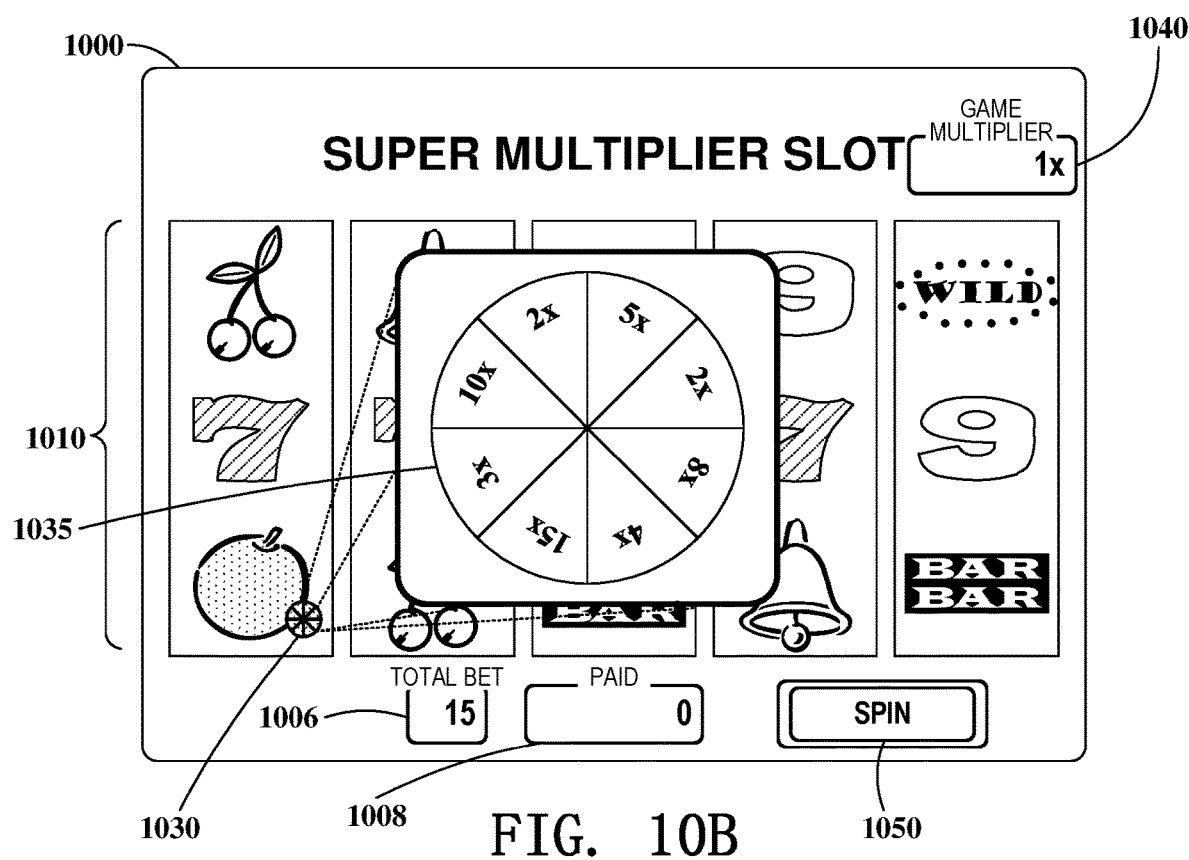

FIGS. 10A, 10B, 10C, and 10D are diagrams of a gaming display showing another progression of game events using subsymbols according to embodiments of the invention. Referring to FIG. 10A, a game display 1000 includes a game grid 1010 of game symbols, a Total Bet Meter 1006, a Paid Meter 1008, a SPIN Button 1050 and a Game Multiplier Meter 1040. Here, the game reels have been spun and have come to a rest in the game grid 1010. As part of this displayed game outcome, one of the game symbols 1030 is associated with a subsymbol that triggers a bonus feature or event. Referring to FIG. 10B, this bonus feature opens a bonus window with a prize wheel 1035 that includes multiplier values. In other embodiments the prize wheel 1035 may include credit values, prize give-a-ways, progressives, extra symbols, Wild symbols, Bonus symbol, etc., or combinations of the above.

Figure 10C:
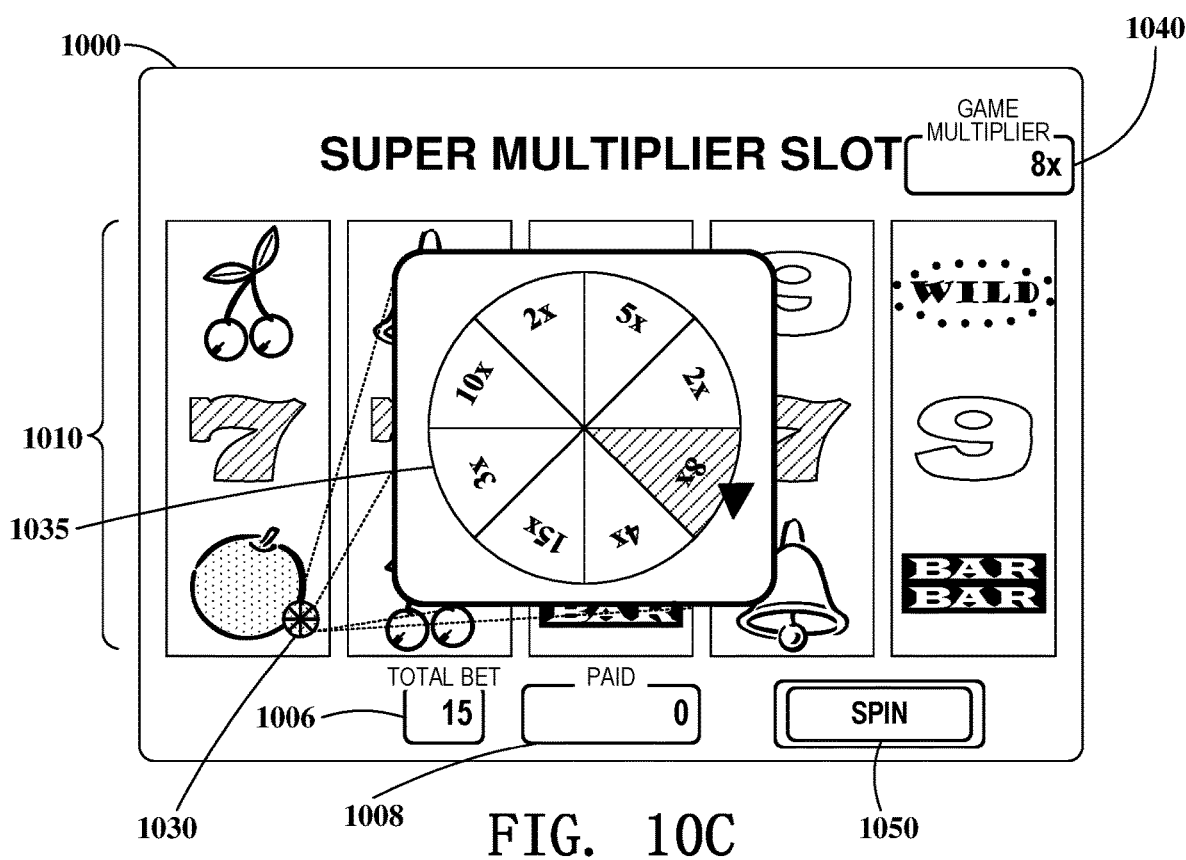
Figure 10D:
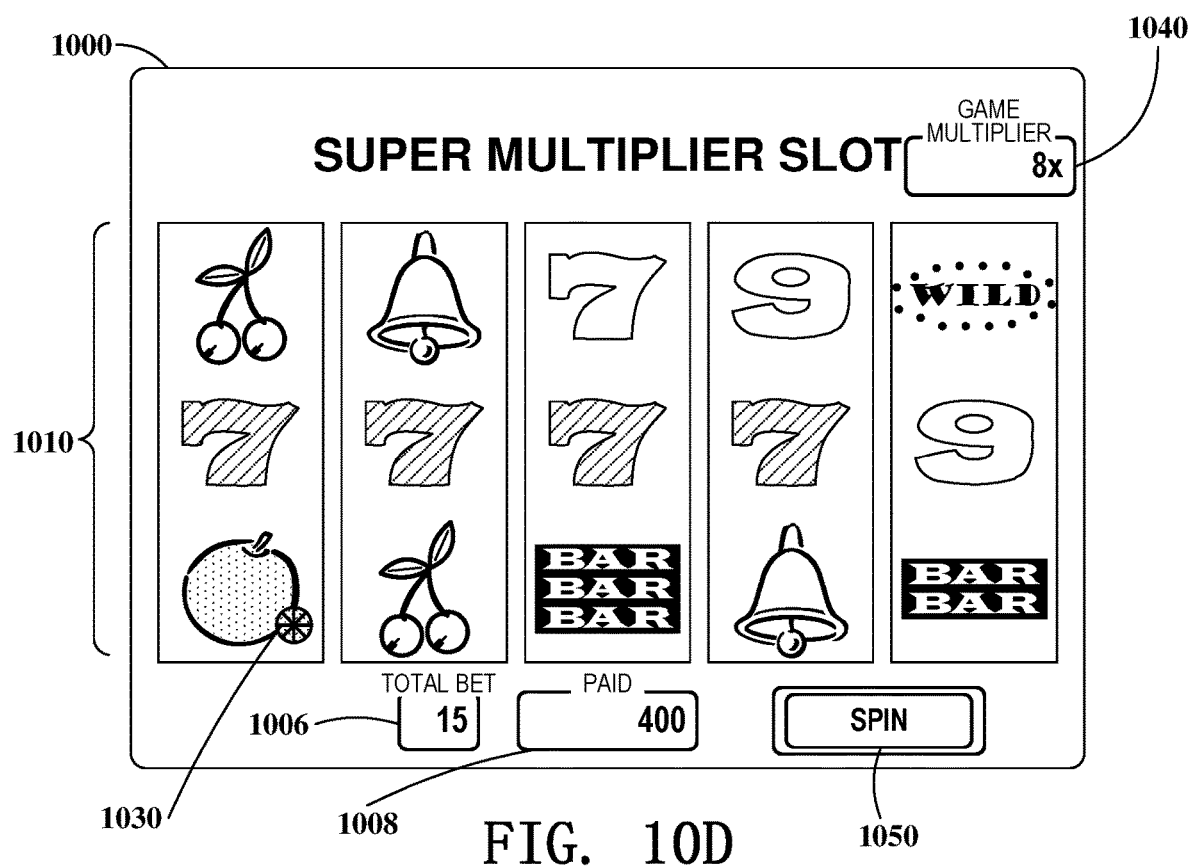

Referring to FIG. 10C, the prize wheel 1035 is spun and a section of the prize wheel is selected. Here, the selected section of the prize wheel is associated with an "8×" multiplier. In some embodiments, these values on the prize wheel 1035 may be static or fixed so that are the same for each bonus feature. In other embodiments, the values shown on the prize wheel 1035 may be dynamic and change according to a probability table or random draw between bonus features. In other embodiments, multiple prize wheels may be used to determine a bonus award or modifier. In other embodiments, the values on the prize wheel 1035, type of prizes offered on the prize wheel, or number of prize wheels may change is more than one symbol is received in a game outcome that is associated with a subsymbol. Here, as shown in FIG. 10D, the game multiplier value of 8× is used to multiply the 50 credit award for the four shaded-sevens to 400 credits total, as reflected in the Paid Meter 1008.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out above and in the appended claims.

The invention claimed is:

1. A video poker machine configured to provide games of chance in response to the placement of wagers, the video poker gaming device comprising:
   a physical gaming cabinet having one or more locks to restrict access to the inside of the gaming cabinet;
   a display mounted to the cabinet, the display including a video screen having a poker game play grid;
   a player interface device attached to the cabinet and including at least one button, the button configured to generate a signal in response to being activated;
   a memory housed inside the cabinet and configured to store a virtual deck of cards and a credit amount;
   a random number generator housed inside the cabinet;
   a wager input device mounted to the cabinet and structured to receive physical items associated with currency values; and
   a processor housed inside of the cabinet, the processor operable to:
      receive a signal from the wager input device indicating receipt of a physical item associated with a currency value;
      increase the credit amount stored in the memory based on the currency value associated with the received physical item;
      receive a primary game initiation signal from the player interface device including a wager amount, the wager amount deducted from the credit amount stored in the memory;
      randomly determine a card in the virtual deck of cards to associate with a bonus subsymbol based on a first random value provided by the random number generator;
      randomly deal a poker hand from the virtual deck of cards to the poker game play grid on the display based on second random values provided by the random number generator;
      determine if any of the cards dealt to the poker hand are associated with the bonus subsymbol;
      initiate a secondary bonus event on the display when one of the cards dealt to the poker hand is associated with the bonus subsymbol to determine a bonus modifier;
      determine awards associated with the poker hand based off of a predefined paytable;
      modify any determined awards associated with the poker hand based on the bonus modifier; and
      increase the credit amount stored in the memory by any determined awards as modified by the bonus modifier.

2. The video poker machine of claim 1, wherein the secondary bonus event is a dice roll to determine a multiplier value as the bonus modifier.

3. The video poker machine of claim 2, wherein the secondary bonus event includes two dice, where the first die if rolled to determine a first outcome value, where the second die is rolled to determine a second outcome value, and where the first outcome value and the second outcome values are added together to provide a multiplier value as the bonus modifier.

4. The video poker machine of claim 2, wherein the secondary bonus event includes two dice, where the first die if rolled to determine a first outcome value, where the second die is rolled to determine a second outcome value, and where the first outcome value and the second outcome values are multiplied together to provide a multiplier value as the bonus modifier.

5. The video poker machine of claim 1, wherein the secondary bonus event is a wheel spin to determine a multiplier value as the bonus modifier.

6. The video poker machine of claim 5, wherein the secondary bonus event includes two wheels having multiplier values, where the first wheel is spun to determine a first multiplier value, where the second wheel is spun to determine a second multiplier value, and where the first multiplier value is added to the second multiplier value to provide the bonus modifier.

7. The video poker machine of claim 5, wherein the secondary bonus event includes two wheels having multiplier values, where the first wheel is spun to determine a first multiplier value, where the second wheel is spun to determine a second multiplier value, and where the first multiplier value is multiplied by the second multiplier value to provide the bonus modifier.

8. A video poker machine configured to provide games of chance in response to the placement of wagers, the video poker gaming device comprising:
   a physical gaming cabinet having one or more locks to restrict access to the inside of the gaming cabinet;
   a display attached to the gaming cabinet, the display including a video screen having a poker game play grid;
   a player interface attached to the gaming cabinet, the player interface including at least one button, the button configured to generate a signal in response to being activated;
   a memory housed in the gaming cabinet, the memory configured to store a virtual deck of cards and a credit amount;
   a random number generator housed inside the cabinet;
   a wager input device housed in the gaming cabinet, the wager input device structured to receive physical items associated with currency values; and
   a processor housed in the gaming cabinet, the processor operable to:
      receive a signal from the wager input device indicating receipt of a physical item associated with a currency value;
      increase the credit amount stored in the memory based on the currency value associated with the received physical item;
      receive a primary game initiation signal from the player interface including a wager amount, the wager amount deducted from the credit amount stored in the memory;
      randomly determine a card in the virtual deck of cards to associate with a bonus subsymbol based on a first random value provided by the random number generator;
      randomly deal an initial poker hand from the virtual deck of cards to the poker game play grid on the display based on second random values provided by the random number generator;
      determine if any of the cards dealt to the initial poker hand are associated with the bonus subsymbol;
      initiate a secondary bonus event when one of the cards dealt to the initial poker hand is associated with the bonus subsymbol to determine a bonus modifier;
      display the bonus modifier on the video screen;
      receive signals from the player interface indicating cards to be held in the initial poker hand;
      replace any cards not held in the initial poker hand with randomly drawn cards from the virtual deck of cards based on third random values provided by the random number generator to form a final poker hand, the final poker hand displayed on the display, determine awards associated with the final poker hand based off of a predefined paytable;

modify any determined awards associated with the final poker hand with the bonus modifier; and increase the credit amount stored in the memory by any determined awards as modified by the bonus modifier.

9. The video poker machine of claim 8, wherein if the processor determines that none of the cards dealt to the initial poker hand are associated with the bonus subsymbol, the processor is further operable to:

determine if any of the cards in the final poker hand are associated with the bonus subsymbol, and initiate a secondary bonus event when one of the cards in the final poker hand is associated with the bonus subsymbol to determine a bonus modifier.

10. The video poker machine of claim 8, wherein if the processor determines that none of the cards dealt to the initial poker hand are associated with the bonus subsymbol, the processor is further operable to:

randomly redetermine a card in the virtual deck of cards to associate with the bonus subsymbol;

determine if any of the cards in the final poker hand are associated with the bonus subsymbol, and initiate a secondary bonus event when one of the cards in the final poker hand is associated with the bonus subsymbol to determine a bonus modifier.

11. The video poker machine of claim 8, wherein the secondary bonus event is a dice roll to determine a multiplier value as the bonus modifier.

12. The video poker machine of claim 11, wherein the secondary bonus event includes two dice, where the first die if rolled to determine a first outcome value, where the second die is rolled to determine a second outcome value, and where the first outcome value and the second outcome values are added together to provide a multiplier value as the bonus modifier.

13. The video poker machine of claim 11, wherein the secondary bonus event includes two dice, where the first die if rolled to determine a first outcome value, where the second die is rolled to determine a second outcome value, and where the first outcome value and the second outcome values are multiplied together to provide a multiplier value as the bonus modifier.

14. The video poker machine of claim 8, wherein the secondary bonus event is a wheel spin to determine a multiplier value as the bonus modifier.

15. The video poker machine of claim 14, wherein the secondary bonus event includes two wheels having multiplier values, where the first wheel is spun to determine a first multiplier value, where the second wheel is spun to determine a second multiplier value, and where the first multiplier value is added to the second multiplier value to provide the bonus modifier.

16. The video poker machine of claim 14, wherein the secondary bonus event includes two wheels having multiplier values, where the first wheel is spun to determine a first multiplier value, where the second wheel is spun to determine a second multiplier value, and where the first multiplier value is multiplied by the second multiplier value to provide the bonus modifier.

17. A video poker machine configured to provide games of chance in response to the placement of wagers, the video poker gaming device comprising:

a physical gaming cabinet having one or more locks to restrict access to the inside of the gaming cabinet;

a display mounted to the cabinet, the display including a video screen having a poker game play grid;

a player interface device attached to the cabinet and including at least one button, the button configured to generate a signal in response to being activated;

a memory housed inside the cabinet and configured to store a virtual deck of cards and a credit amount;

a random number generator housed inside the cabinet;

a wager input device mounted to the cabinet and structured to receive physical items associated with currency values; and a processor housed inside of the cabinet, the processor operable to:

receive a signal from the wager input device indicating receipt of a physical item associated with a currency value;

increase the credit amount stored in the memory based on the currency value associated with the received physical item;

receive a primary game initiation signal from the player interface device including a wager amount, the wager amount deducted from the credit amount stored in the memory;

randomly determine a card in the virtual deck of cards to associate with a bonus subsymbol based on a first random value provided by the random number generator;

randomly determine a bonus modifier value to associate with the bonus subsymbol based on a second random value provided by the random number generator;

assign a visual depiction of the bonus subsymbol based on the determined bonus modifier value;

randomly deal a poker hand from the virtual deck of cards to the poker game play grid on the display based on third random values provided by the random number generator, where if the card associated with the bonus subsymbol is part of the dealt poker hand, display the assigned visual depiction of the bonus subsymbol on the video screen;

determine awards associated with the poker hand based off of a predefined paytable;

modify any determined awards associated with the poker hand based on the bonus modifier value associated with the bonus subsymbol if the card associated with the bonus subsymbol was part of the poker hand; and increase the credit amount stored in the memory by any determined awards as modified by the bonus modifier.

18. The video poker machine of claim 17, wherein the bonus modifier value is a multiplier value.

19. The video poker machine of claim 18, wherein the visual depiction of the bonus subsymbol is a numerical representation of the multiplier value.

20. The video poker machine of claim 18, wherein the visual depiction of the bonus subsymbol is a side of dice where a number of pips shown on the dice side matches the multiplier value.

* * * * *